(12) United States Patent
Bertinato et al.

(10) Patent No.: US 10,631,661 B2
(45) Date of Patent: Apr. 28, 2020

(54) VOICE CONTROL SYSTEM FOR MANIPULATING SEATING/RECLINING FURNITURE

(71) Applicant: UNITERS S.P.A., Montecchio Maggiore VI (IT)

(72) Inventors: Diego Bertinato, Vicenza (IT); Gordian Conrad Anton Tork, Palm Beach Gardens, FL (US)

(73) Assignee: UNITERS S.P.A., Montecchio Maggiore (IT)

(*) Notice: Subject to any disclaimer, the term of this patent is extended or adjusted under 35 U.S.C. 154(b) by 0 days.

(21) Appl. No.: 15/869,112

(22) Filed: Jan. 12, 2018

(65) Prior Publication Data
US 2019/0216228 A1    Jul. 18, 2019

(51) Int. Cl.
| | |
|---|---|
| A47C 31/00 | (2006.01) |
| A47C 1/024 | (2006.01) |
| A47C 17/04 | (2006.01) |
| G05B 15/02 | (2006.01) |
| G10L 15/22 | (2006.01) |
| A47C 7/72 | (2006.01) |
| G06F 3/16 | (2006.01) |
| G06N 3/00 | (2006.01) |

(52) U.S. Cl.
CPC ............ *A47C 31/008* (2013.01); *A47C 1/024* (2013.01); *A47C 1/0242* (2013.01); *A47C 7/72* (2013.01); *A47C 17/04* (2013.01); *G05B 15/02* (2013.01); *G06F 3/167* (2013.01); *G10L 15/22* (2013.01); *G06N 3/006* (2013.01); *G10L 2015/223* (2013.01)

(58) Field of Classification Search
CPC ...... A47C 31/008; A47C 1/024; G05B 15/02; G06N 3/006; G10L 15/22

USPC ......................................................... 340/12.5
See application file for complete search history.

(56) References Cited

U.S. PATENT DOCUMENTS

| | | | | |
|---|---|---|---|---|
| 5,812,978 A | * | 9/1998 | Nolan ................... | A61G 5/045 704/275 |
| 6,230,138 B1 | * | 5/2001 | Everhart ................. | G10L 15/26 704/275 |

(Continued)

FOREIGN PATENT DOCUMENTS

| | | |
|---|---|---|
| DE | 10 2017 100 595 A1 | 7/2018 |
| EP | 3 348 173 A2 | 7/2018 |
| WO | WO 2008/128250 A1 | 10/2008 |

OTHER PUBLICATIONS

CNET: "Robot Furniture Makes One Room Feel Like Three", p. 1, URL:https://www.youtube.com/watch?v=PhwcXFpahZ8, Jun. 29, 2017.

*Primary Examiner* — Omar Casillashernandez
(74) *Attorney, Agent, or Firm* — Norman B. Thot

(57) ABSTRACT

A voice control system for a seating/reclining furniture includes the seating/reclining furniture having at least one component which is manipulated by an actuator, an intelligent personal assistant (IPA) which accepts a voice command to actuate the actuator and to convert the voice command into a control command for controlling the actuator, a data interface which receives the control command from the intelligent personal assistant (IPA), and a control unit which is connected in a technical signal manner between the data interface and the actuator. The control unit selectively actuates the actuator based on the control command.

14 Claims, 2 Drawing Sheets

(56) References Cited

U.S. PATENT DOCUMENTS

| | | | |
|---|---|---|---|
| 6,964,370 B1* | 11/2005 | Hagale | A47C 31/008 |
| | | | 235/380 |
| 8,596,716 B1 | 12/2013 | Caruso | |
| 10,085,562 B1* | 10/2018 | Labrosse | A47B 9/00 |
| 2008/0262657 A1 | 10/2008 | Howell et al. | |
| 2010/0201165 A1* | 8/2010 | Dankovich | A47B 83/001 |
| | | | 297/135 |
| 2012/0316884 A1* | 12/2012 | Rozaieski | A61G 5/10 |
| | | | 704/275 |
| 2015/0059096 A1* | 3/2015 | Rawls-Meehan | A47C 20/041 |
| | | | 5/616 |
| 2016/0242548 A1 | 8/2016 | Barnum et al. | |
| 2016/0267075 A1* | 9/2016 | Ishikawa | G06F 17/289 |
| 2016/0288669 A1* | 10/2016 | Woodhouse | B60N 2/995 |
| 2017/0295949 A1 | 10/2017 | Sizer et al. | |
| 2018/0041354 A1* | 2/2018 | Nelson | A47C 7/72 |
| 2018/0228006 A1* | 8/2018 | Baker | H05B 37/0236 |
| 2018/0360218 A1* | 12/2018 | Labrosse | G05B 19/402 |
| 2019/0090056 A1* | 3/2019 | Rexach | H04R 3/005 |

* cited by examiner

VOICE CONTROL SYSTEM FOR MANIPULATING SEATING/RECLINING FURNITURE

FIELD

The present invention relates to a voice control system for seating/reclining furniture such as an armchair or a suite that has a plurality of seating units and that has at least one component that can be manipulated by an actuator and that can be controlled by voice commands initiated or spoken by a user so that the piece of furniture can also be called a "smart chair". The present invention also relates to seating/reclining furniture that is configured for use in such a voice control system.

BACKGROUND

Armchairs, which are also colloquially referred to as TV chairs, have, for example, previously been described that comprise components that can be manipulated by actuators. Such chairs can, for example, in particular comprise components that can be manipulated by an actuator in the form of a seat part that can be adjusted by an actuator, of a back part that can be adjusted by an actuator, a headrest that can be adjusted by an actuator, a footrest that can be adjusted by an actuator, or, for example, an armrest that can be adjusted by an actuator, to name but a few exemplary components of such chairs that can be manipulated. Such chairs can also, for example, have a massage function. For this purpose, such a chair can have a component that can be manipulated by an actuator, for example, a back part or a seat part, into which the corresponding massage actuators are integrated via which the respective component can be moved and/or deformed in itself and thus manipulated for massage purposes.

The actuators of such chairs are typically controlled by a wired remote control that has discrete buttons, the actuation of which controls or activates a defined operating mode or actuation mode of the respective actuator. Such a remote control typically has one button, for example, whose actuation pivots the back part of the chair to the rear and another button whose actuation pivots the rear part of the chair to the front. Corresponding buttons can also be provided for the different operating modes or actuation modes of the actuators for the headrest, for the seat part, for the footrest, the armrests and/or the massage actuators.

The operating comfort of chairs that can be operated by a wired remote control is better compared with a chair in which the individual components must be actuated manually or purely mechanically; there is nevertheless a certain need for improvement with respect to operating comfort since the user of the chair must always have access to the remote control to activate individual functions, which can in particular be difficult in a reclining position of the piece of seating/reclining furniture if the remote control cannot be reached from the reclining position or can only be reached with difficulty.

SUMMARY

An aspect of the present invention is to improve the comfort such seating/reclining furniture offers to the user.

In an embodiment, the present invention provides a voice control system for a seating/reclining furniture which includes the seating/reclining furniture comprising at least one component which is configured to be manipulated by at least one actuator, an intelligent personal assistant (IPA) configured to accept a voice command to actuate the at least one actuator and to perform a conversion of the voice command into a control command for controlling the at least one actuator, a data interface configured to receive the control command from the intelligent personal assistant (IPA), and a control unit which is connected in a technical signal manner between the data interface and the at least one actuator, the control unit being configured to selectively actuate the at least one actuator based on the control command. The present invention in particular provides that the voice control system makes use of an intelligent personal assistant (IPA) to accept voice commands of a user to actuate the at least one actuator and to convert them into control commands to control the at least one actuator.

BRIEF DESCRIPTION OF THE DRAWINGS

The present invention is described in greater detail below on the basis of embodiments and of the drawings in which.

DETAILED DESCRIPTION

Figure 1:
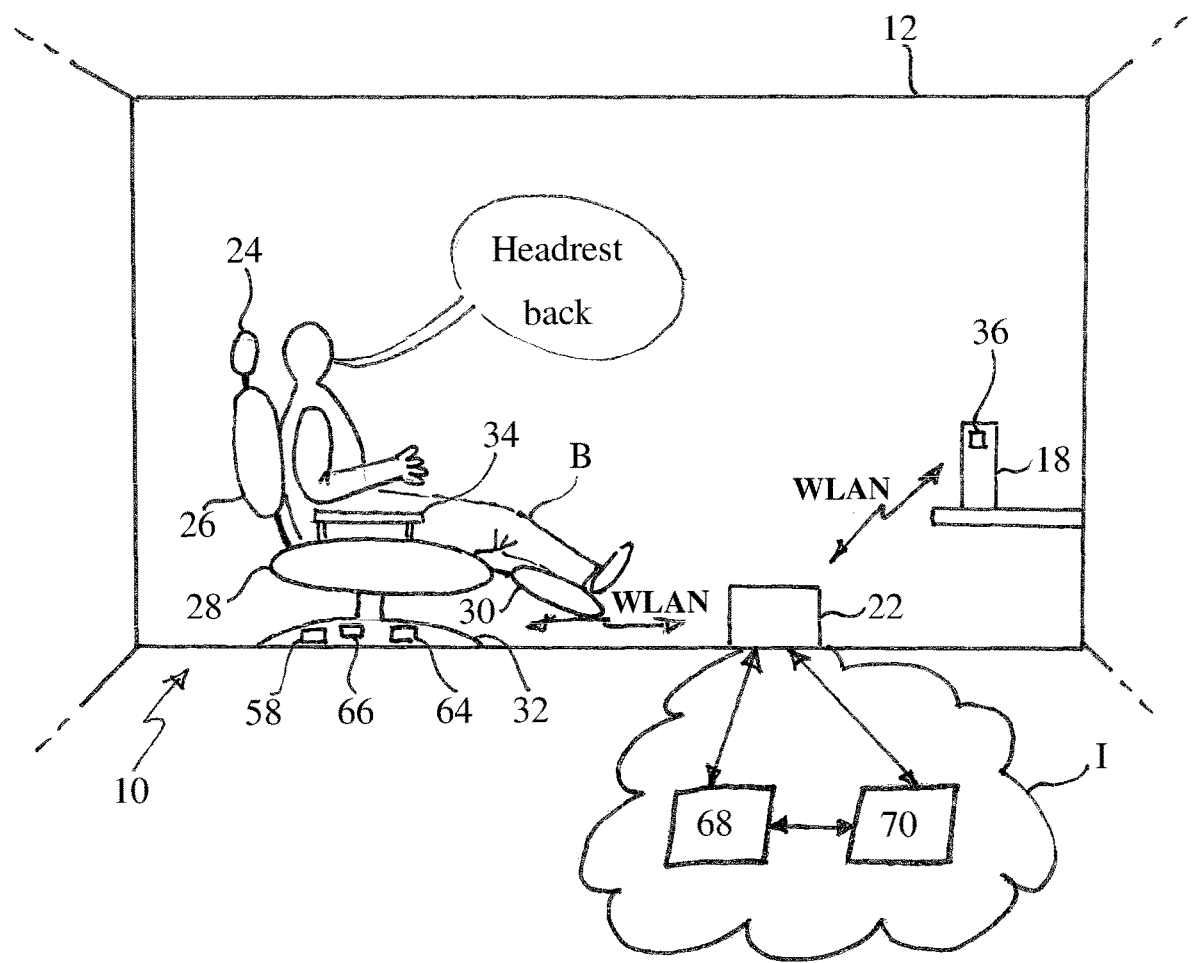
FIG. 1 illustrates a living room situation with a voice control system in accordance with the present invention.

To be able to accept the control commands, the seating/reclining furniture has a data interface which can, for example, be a wireless interface, in particular a wireless LAN or Bluetooth interface, but also a wired interface. The seating/reclining furniture furthermore has a control unit that is connected in a technical signal manner between the data interface and the at least one actuator and that is configured to actuate the at least one actuator selectively on the basis of the control commands received by the data interface.

The IPA can, for example, be the voice assistant Alexa from Amazon, the Google Assistance from Google, or the voice assistant Cortana from Microsoft, to name just a few of the better known IPAs. It is common to all these IPAs that they enable an intuitive interface between the user and a system or a device, such as in accordance with the seating/reclining furniture of the present invention, whereby commands for controlling the respective device can be worded in a "more human" manner. Voice input must be recognized and understood by the respective IPA in order for the voice input to take place by the user. Voice recognition algorithms and parsing algorithms are used therefor, with a recognized voice command subsequently being delegated to a corresponding application. If voice commands are not correctly recognized, the IPA can direct a query to the user or ask him/her for a confirmation. To enable response times that are as fast as possible, most data are processed on servers of the providers (e.g., Amazon, Google, Microsoft) in the cloud, which means that an internet connection is required.

In the case of Alexa from Amazon as the IPA, for example, the smart loudspeaker "Echo" accepts voice commands from the user that are then subsequently forwarded as audio files to a so-called "natural language processing" unit (NLP) in the cloud. The NLP unit is a computer linguistic device and is a module of artificial intelligence. This unit manages the transition between language and informatics, with the NLP learning to understand the spoken word or voice commands with the aid of grammar rules, lexica, statistics, and algorithms.

The following five steps are undertaken, among others:

1. Chains of letters are counted and are divided into words and sentences as part of tokenization.
2. As part of a morphological examination, the word level is examined in order to recognize, for example, locations, persons, organizations, or names therein.
3. As part of a syntactic analysis, structures within a sentence are considered and analyzed; objects, verbs and adjectives are, for example, evaluated.
4. A specific meaning is associated with the sentence parts as part of a semantic analysis.
5. Relationships between individual sentences are recognized within a discourse analysis, with this evaluation taking place in a cross-sentence manner.

After the analysis in the NLP unit, the evaluated sentences and words are converted into "JSON" (JavaScript object notation) formats. In the next step, the JSON data are transmitted by the apps or skills for the demands. The skills in the case of Alexa from Amazon are part of the AWS Lambda that are likewise in the cloud. The AWS Lambda is a serverless data processing service that performs the code on the occurrence of specific events and automatically manages the underlying data processing resources. The AWS Lambda finally works together with the seating/reclining furniture as the end device and manages the communication between the artificial intelligence in the cloud and the seating/reclining furniture. After the processing of the commands in the cloud, and while using the data by the seating/reclining furniture, a feedback takes place that, with the seating/reclining furniture, comprises the respective actuator being actuated and thus the associated component being adjusted on a correct recognition of a voice command.

Via the use of the intelligent personal assistant, the control of the individual functions or of the respective actuators of the piece of furniture therefore does not take place in a known manner via a wired remote control by actuating discrete buttons, the present invention much rather uses the voice recognition function of an IPA to invoke the individual functions or actuators of the furniture by voice commands.

It can be advantageous for the data interface of the furniture to receive the control commands wirelessly from the IPA, for example, by wireless LAN or Bluetooth, since the furniture can in this case be set up at any suitable location in the home with a wireless LAN and/or Bluetooth reception. It can be advantageous in this case for the seating/reclining furniture to comprise a rechargeable battery for the power supply of the individual electrical consumers of the seating/reclining furniture, such as at least one actuator and/or the control unit with electrical energy, since the installation location of the furniture in this case also does not depend on the proximity to a power outlet for the power supply.

In an embodiment of the present invention, provision can, for example, be made that the IPA is arranged spatially separate from the seating/reclining furniture.

In an embodiment of the present invention, a microphone that is configured to convert the voice commands into signals can, for example, be arranged spatially separate from the seating/reclining furniture.

In an embodiment of the present invention, a device, for example, an intelligent loudspeaker that comprises a microphone configured to convert the voice commands into signals and the seating/reclining furniture can, for example, each be configured to be integrated into a common local network, in particular into a common wireless local area network (wireless LAN).

The generation of the control commands from the voice commands can take place exclusively by a third party provider associated with the IPA (e.g., by Amazon), in particular in its cloud from where the control commands are communicated directly or over a further service provider, in particular its cloud, back to the seating/reclining furniture or to the network in which the seating/reclining furniture is integrated. The service provider can in particular be the manufacturer of the seating/reclining furniture. Alternatively, only a first part of the conversion of the voice commands into the control commands can take place at the third party provider, with the further conversion and communication to the seating/reclining furniture and optionally further services being provided by the service provider. The further services can be any desired services such as a remote maintenance of the seating/reclining furniture, in particular services that are related to the voice control of the seating/reclining furniture. The manufacturer of the seating/reclining furniture can in particular also utilize its corresponding service unit, in particular its cloud, that communicates with the unit of the third party provider, in particular its cloud, for its own services that do not directly represent a service to the user of the seating/reclining furniture, for example, the carrying out of data evaluations relating to all or some of the delivered pieces of seating/reclining furniture. The communicated commands and data can furthermore respectively additionally comprise a furniture identification so that, for example, the service unit, in particular a cloud of the manufacturer of the furniture, can recognize which piece of furniture is to be controlled by a respective voice command.

Against this background, an embodiment of the present invention provides that the IPA can, for example, be associated with a third party provider that is in particular independent of the manufacturer of the piece of furniture and that is connected or connectable via the internet to a third partly provider unit, in particular to a computer, a server, and/or a cloud of the third party provider, with the third party provider unit being configured to carry out at least a part of the conversion of the voice commands into the control commands.

Provision can in particular be made in this respect that the third party provider unit communicates with the seating/reclining furniture or with a local network into which the seating/reclining furniture is integrated via a service unit, for example, comprising a computer, a server, and/or a cloud, in particular a manufacturer unit associated with the manufacturer of the seating/reclining furniture. In this respect, the third party provider unit is either configured to carry out the complete conversion of the voice commands into the control commands and the service unit is configured to communicate at least the control commands to the seating/reclining furniture, or the third party provider unit is configured to carry out a first part of the conversion of the voice commands into the control commands and the service unit is configured to carry out a further part of the conversion of the voice commands into the control commands and to communicate the control commands to the seating/reclining furniture.

In an embodiment of the present invention, provision can, for example, be made that one or more components, in particular the footrest, has a safety device, for example, in the form of a pressure-sensitive sensor that is in particular formed, for example, as a rail, as a plate, or as a mat, and that can be integrated into the respective component. Such a sensor can respond, for example, when a resistance that acts against the adjustment movement is noticed on the adjustment of the component. If the inwardly folding footrest therefore, for example, traps or threatens to trap an object, a pet or a body part of the user, this danger situation can be transmitted to the control unit of the furniture which thereupon stops the movement and to this extent interrupts the voice-controlled control of the actuators. A higher priority is thus associated with the safety device than to the voice-based control of the actuators.

The present invention also relates to seating/reclining furniture, in particular to an armchair or to a suite, having a plurality of seating units, for a voice control system in accordance with the present invention, wherein the seating/reclining furniture comprises at least one component that can be manipulated by an actuator, and wherein the seating/reclining furniture comprises a data interface for receiving voice controls from the IPA of the voice control system and a control unit that is connected in a technical signal manner between the data interface and the at least one actuator and that is configured to actuate the at least one actuator selectively on the basis of the control commands.

The voice control system in accordance with the present invention for seating/reclining furniture will be described purely by example below under reference to the drawings.

FIG. 1 shows a living room situation with a voice control system in accordance with the present invention for seating/reclining furniture 10 in a living room 12. The seating/reclining furniture 10, which is also referred to below as furniture 10, has a base 32 with which the furniture 10 stands on the floor of the living room 12. A seat part 28 to which a back part 26 serving as a backrest and a footrest 30 are connected in an articulated manner is fastened to the base 32. A headrest 24 is in turn connected in an articulated manner to the back part 26. The furniture 10 furthermore has armrests 34 that can, for example, be fastened to the seat part 28. The position of the seat part 28 is variable with respect to the base 32, the position of the back part 26 is equally variable with respect to the seat part 28, the position of the footrest 30 is variable with respect to the seat part 28, and the position of the headrest 24 is also variable with respect to the back part 26. The position of the armrests 24 can also be varied with respect to the seat part 28.

To be able to adjust the position of these components 24, 26, 28, 30, 34, corresponding actuators $A_i$, such as servo motors and/or piston-in-cylinder units are provided (which are not shown in the drawings for reasons of clarity). The furniture 10 can furthermore, for example, have actuators integrated into the back part 26 by whose actuation the back part 26 can be manipulated for massage purposes.

Such actuators are typically controlled by a wired remote control, for which purpose the remote control has a plurality of buttons for controlling the respective actuators. In contrast thereto, the present invention controls the actuators in question by voice commands that are initiated or spoken by a user B who is seated on the furniture 10 in the living room situation shown.

To convert such voice commands into control commands that can be understood by the actuators $A_i$ of the seating/reclining furniture 10, the voice control system in accordance with the present invention makes use of an intelligent personal assistant (IPA) such as the voice control assistant Alexa from Amazon (or a corresponding assistant of another third party provider) that is located in the cloud of the third party provider 68.

An intelligent loudspeaker 18 which can, for example, be an Amazon Echo loudspeaker, here serves as the interface between the user B and the IPA. Such an intelligent loudspeaker 18 typically has at least one microphone 36 via which the voice commands spoken by the user B can be accepted. The intelligent loudspeaker 18 is connected to the internet I via a router 22, for example, that provides access to the cloud of the third party provider 68 and thus to the IPA, such as the voice assistant Alexa from Amazon.

If therefore, for example, the user B speaks the voice command "headrest back", this voice command can be detected by the microphone 36 of the intelligent loudspeaker 18 and can be forwarded over the internet to the IPA that converts the voice command "headrest back" in the previously described manner into a control command suitable for the control of the headrest actuator while making use of a corresponding program—in the case of Alexa from Amazon as the IPA while making use of a correspondingly programmed skill.

The voice command converted into a control command in this manner can then subsequently be communicated via the router 22 either via the intelligent loudspeaker 18 or directly to the furniture 10, for which purpose the latter has a data interface 64 for accepting such control commands.

As mentioned above, the generation of the control commands from the voice commands can take place in a possible variant of the present invention solely by a third party provider, for example, by Amazon, associated with the IPA in its cloud 68 comprising the IPA ("third party provider unit") from where the control commands are communicated via a cloud 70 ("manufacturer unit") of the manufacturer of the furniture 10 to the router 22 and thus via wireless LAN to the furniture 10. Provision can additionally be made that the cloud of the manufacturer 70 not only communicates the control commands to the router 22, but also additionally advises the cloud of the third party provider 68 of which piece of furniture which command was issued for, whereupon the cloud of the third party provider 68 in turn controls the loudspeaker 18 located on site via the router 22 and thus by wireless LAN to thus acknowledge the voice command previously output by the user B in an acoustic manner audible for the user B. The user B who had, for example, previously issued the voice command "headrest back" is, for example, given the acknowledgment "headrest is being moved back" simultaneously with or briefly before the actual actuation of the headrest 24.

An activation, initialization or wake-up procedure can furthermore be connected upstream of this procedure. For example, the piece of furniture 10 can, for example, automatically communicate to the cloud of the manufacturer 70 on the basis of the sensors integrated in the furniture 10 that a user B has seated himself/herself in the furniture 10 and the user B can advise the cloud of the third party provider 68 via the microphone 36 that he/she would like to set the control of the furniture 10 in readiness. The cloud of the manufacturer 70 that, for example, manages all such pieces of furniture of the manufacturer advises the cloud of the third party provider 68 which piece of furniture it is. The third party provider cloud 68 in turn advises the cloud of the manufacturer 70 which command it has understood (here, for example, "set furniture control into readiness"), whereupon the cloud of the manufacturer 70 advises the cloud of the third party provider 68 what it should reply to the user B. It is then confirmed to the user B by the cloud of the third party provider 68 via the intelligent loudspeaker 18 that the furniture control is ready to receive voice commands.

Figure 2:
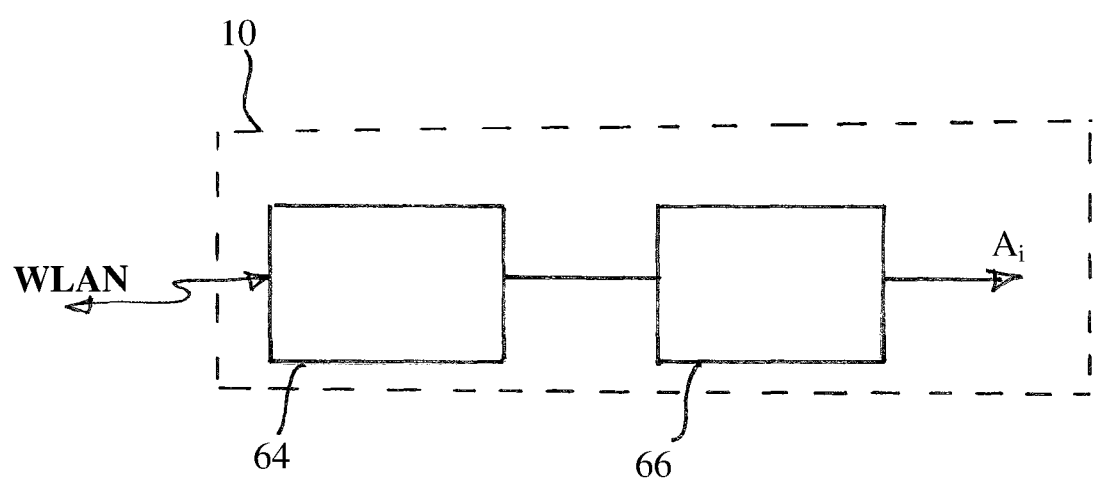
FIG. 2 illustrates the command processing within the seating/reclining furniture.

As can be seen from FIG. 2, a control unit 66 is interposed in a technical signal manner between the data interface 64 and the actuators $A_i$ of the furniture 10 in this respect and is configured to actuate the respective actuator $A_i$ selectively on the basis of a control command. The control unit 66 can, for example, have a microcontroller and a plurality of relays controlled thereby that are switched by the microcontroller on the basis of the control commands. If therefore, for example, the control unit 66 receives a control command via the data interface 64 by which the headrest 24 should be positioned to the rear, this control command is recognized by the microcontroller and the relay associated with the actuator of the headrest 24 is accordingly switched by the microcontroller so that the headrest actuator can have current applied thereupon.

As can furthermore be seen from FIG. 1, the furniture 10 of the voice control system in accordance with the present invention can comprise a rechargeable battery 58 for supplying the electrical consumers of the furniture 10 such as the actuators or the control unit 66 with electrical energy. In the embodiment shown here, the rechargeable battery 58 is integrated into the base 32 of the furniture 10, with the rechargeable battery 58 naturally also being able to be accommodated in another component of the furniture 10. Such a rechargeable battery 58 can, for example, also be integrated into the back part 26 in some cases so that the rechargeable battery 58 can be pushed from the rear into a corresponding receiver in the back part 26, with the rechargeable battery 58 being freely accessible from the outside in the inserted state and being visible as a design feature.

The present invention is not limited to embodiments described herein; reference should be had to the appended claims.

LIST OF REFERENCE NUMERALS 10 seating/reclining furniture
12 living room
18 intelligent loudspeaker (for example Amazon Echo)
22 router
24 headrest
26 back part
28 seat part
30 footrest
32 base
34 armrest
36 microphone
58 rechargeable battery
64 data interface
66 control unit
68 cloud of the third party provider
70 cloud of the manufacturer/manufacturer unit
$A_i$ actuators
I internet
B user

What is claimed is:

1. A voice control system for a seating/reclining furniture, the voice control system comprising:
the seating/reclining furniture comprising at least one component which is configured to be manipulated by at least one actuator; and
an intelligent personal assistant (IPA) configured to accept a voice command to actuate the at least one actuator and to perform a conversion of the voice command into a control command for controlling the at least one actuator,
wherein the seating/reclining furniture further comprises,
a data interface configured to receive the control command from the intelligent personal assistant (IPA), and
a control unit which is connected in a technical signal manner between the data interface and the at least one actuator, the control unit being configured to selectively actuate the at least one actuator based on the control command,
wherein,
the intelligent personal assistant (IPA) is associated with a third party provider that is independent of a manufacturer of the seating/reclining furniture and that is connected or is connectable via the internet to a third party provider unit,
the third party provider unit is configured to communicate with the seating/reclining furniture or with a local network into which the seating/reclining furniture is integrated via a service unit which is cloud associated with a manufacturer of the seating/reclining furniture, and
either,
the third party provider unit is configured to perform all parts of the conversion of the voice command into the control command, and the service unit is configured to communicate at least the control command to the seating/reclining furniture,
or,
the third party provider unit is configured to perform a first part of the conversion of the voice command into the control command, and the service unit is configured to perform a further part of the conversion of the voice command into the control command and to communicate the control command to the seating/reclining furniture.

2. The voice control system as recited in claim 1, wherein the seating/reclining furniture is an armchair or a suite comprising a plurality of seating units.

3. The voice control system as recited in claim 1, wherein the intelligent personal assistant (IPA) is selected from Alexa from Amazon, Cortana from Microsoft, Google Assistant from Google, and Siri from Apple.

4. The voice control system as recited in claim 1, wherein the third party provider unit is at least one of a computer, a server, and a cloud of the third party provider.

5. The voice control system as recited in claim 1, wherein the data interface is a wireless interface.

6. The voice control system as recited in claim 5, wherein the wireless interface is a wireless LAN or a Bluetooth interface.

7. The voice control system as recited in claim 1, wherein the seating/reclining furniture further comprises:
at least one electrical consumer which comprises at least one of the at least one actuator and the control device; and
a rechargeable battery which is configured to supply the at least one electrical consumer with electrical energy.

8. The voice control system as recited in claim 1, wherein the at least one component which is configured to be manipulated by the at least one actuator includes a seat part configured to be adjustable via a first actuator, a back part configured to be adjusted by a second actuator, a headrest configured to be adjusted by a third actuator, a footrest configured to be adjusted by a fourth actuator, and an armrest configured to be adjusted by a fifth actuator.

9. The voice control system as recited in claim 1, wherein the intelligent personal assistant (IPA) is arranged to be spatially separate from the seating/reclining furniture.

10. The voice control system as recited in claim 1, further comprising:
a microphone arranged spatially separate from the seating/reclining furniture, the microphone being configured to convert the voice command into signals.

11. The voice control system as recited in claim 10, further comprising a device.

12. The voice control system as recited in claim 11, wherein,
    the device is an intelligent loudspeaker which comprises the microphone, and
    the device, including each of the intelligent loudspeaker and the microphone, are configured to be integrated into a common local network (wireless LAN).

13. A seating/reclining furniture for a voice control system which comprises an intelligent personal assistant (IPA), the seating/reclining furniture comprising:
    at least one component which is configured to be manipulated by at least one actuator;
    a data interface configured to receive a control command from the intelligent personal assistant (IPA) of the voice control system; and
    a control unit which is connected in a technical signal manner between the data interface and the at least one actuator, the control unit being configured to selectively actuate the at least one actuator based on the control command,
    wherein,
    the intelligent personal assistant (IPA) is configured to accept a voice command to actuate the at least one actuator and to perform a conversion of the voice command into a control command for controlling the at least one actuator,
    the intelligent personal assistant (IPA) is associated with a third party provider that is independent of a manufacturer of the seating/reclining furniture and that is connected or is connectable via the internet to a third party provider unit,
    the third party provider unit is configured to communicate with the seating/reclining furniture or with a local network into which the seating/reclining furniture is integrated via a service unit which is cloud associated with a manufacturer of the seating/reclining furniture, and
    either,
    the third party provider unit is configured to perform all parts of the conversion of the voice command into the control command, and the service unit is configured to communicate at least the control command to the seating/reclining furniture,
    or,
    the third party provider unit is configured to perform a first part of the conversion of the voice command into the control command, and the service unit is configured to perform a further part of the conversion of the voice command into the control command and to communicate the control command to the seating/reclining furniture.

14. The seating/reclining furniture as recited in claim 13, wherein the seating/reclining furniture is a chair or a suite comprising a plurality of seating units.

* * * * *